United States Patent Office 3,705,200
Patented Dec. 5, 1972

3,705,200
PROCESS FOR TELOMERIZING CONJUGATED DI-OLEFINS WITH AROMATICS AND OLEFINS
William Bunting, Baton Rouge, La., and Arthur W. Langer, Jr., Watchung, N.J., assignors to Esso Research and Engineering Company
No Drawing. Continuation-in-part of application Ser. No. 15,286, Feb. 27, 1970. This application Oct. 30, 1970, Ser. No. 85,726
Int. Cl. C07c 15/00
U.S. Cl. 260—668                    22 Claims

ABSTRACT OF THE DISCLOSURE

An improved process for telomerizing conjugated diolefins with aromatics and olefins, which comprises contacting a diolefin with an aromatic or an olefin, at reaction conditions in the presence of an organosodium compound chelated with an alkyl or cycloalkyl tertiary polyamine. In a preferred embodiment butadiene is telomerized with toluene, in the presence of a benzylsodium catalyst complexed by heptamethyltetraethylenepentamine to yield pentenylbenzene, which is a useful intermediate for the production of detergents, surfactants, plasticizers and fire retardant additives.

CROSS REFERENCES TO RELATED APPLICATIONS

This application is a continuation-in-part of application Ser. No. 15,286, filed Feb. 27, 1970, in the names of William Bunting and Arthur W. Langer, Jr.

FIELD OF THE INVENTION

This invention relates to an improved process for preparing low molecular weight telomerization products from the reaction of conjugated diolefins with either olefinic or aromatic hydrocarbons. More specifically, this invention relates to the preparation of low molecular weight, linear alkenyl aromatics by use of chelated organosodium catalysts. In a preferred embodiment toluene is reacted wtih butadiene in the presence of benzylsodium chelated wtih an aliphatic or cycloaliphatic tertiary polyamine containing at least two amine groups to give a product consisting predominantly of mono- and di-adducts of butadiene and toluene, which are useful as intermediates for synthesis of plasticizers and flame retardant additives.

PRIOR ART

It is known that low molecular weight alkyl aromatics can be prepared by the reaction of ethylene and toluene in the presence of a benzylsodium catalyst as described in U.S. Pat. No. 2,728,802. This process is limited to addition of one ethylene molecule for each hydrogen atom position on the methyl group of the toluene molecule and does not include telomerization whereby chain propagation would be effected. This process does not produce alkenyl, but instead, alkyl aromatics.

Metallic lithium can also be used as a catalyst for the preparation of alkyl aromatics by the reaction of toluene and ethylene. This reaction is described in U.S. Pat. No. 2,984,691 and, like the above-described process, produces only alkyl aromatics.

U.S. Pat. No. 3,206,519 discloses that lower molecular weight telomers can be formed by the reaction of ethylene with a benzenoid hydrocarbon in the presence of a catalyst comprising hydrocarbyl lithium and hydrocarbylsodium mixed with a nonaromatic tertiary amine. The hydrocarbyl group is preferably alkyl, and the resultant product, unlike that of the instant invention, is an alkyl aromatic.

U.S. Pat. No. 3,189,660 discloses the telomerization of toluene and butadiene with benzylsodium in the presence of tertiary amines. The amines act as the reaction medium and being mono-functional (therefore non-chelating) the resultant telomers have high molecular weights.

SUMMARY OF THE INVENTION

It has now been unexpectedly discovered that low molecular weight telomers can be efficiently produced by telomerizing conjugated diolefins with either aromatic or olefinic hydrocarbons in the presence of a novel catalyst comprising an organosodium compound chelated with a tertiary polyamine. The process of this invention is especially useful for the production of low molecular weight alkenyl aromatics.

The catalysts of the present invention are formed by complexing organosodium compounds with aliphatic or cycloaliphatic tertiary chelating polyamines. The polyamine must be at least di-functional, preferably tri-functional or greater.

Organosodiums useful for this invention can be described by the formula RNa wherein R is a hydrocarbon radical containing from 1–20 carbons, preferably 3–10. In general, any organosodium compound may be used which, when chelated, is capable of initiating polymerization of the diolefin. Preferably, R will be selected from the group consisting of alkyl, cycloalkyl, aryl, aralkyl, alkaryl, alkenyl and cycloalkenyl. The most preferable R groups include benzyl, phenyl, allyl, diphenylmethyl, diphenyl, naphthyl, octenyl, etc.

The polyamines which may be employed as chelating agents are any aliphatic or cycloaliphatic tertiary chelating polyamines containing at least two, preferably three or more, amine groups. Preferably, the polyamine will have the following formula:

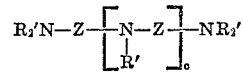

wherein R' can be the same or different alkyl or cycloalkyl group having from 1 to about 10 carbon atoms; Z is selected from the group consisting of (1) a $C_4$–$C_{10}$ cycloaliphatic radical attached to N at the 1,2- or 1,3-positions, and (2) 2 or 3 methylenic radicals wherein each contains 0 to 2 monovalent aliphatic hydrocarbon radicals of 1 to 6 carbon atoms; and $c$ is an integer of 0 to 10,000, preferably an integer from 1 to 4. Suitable non-limiting examples include:

N,N,N',N'-tetramethylethylenediamine (TMED);
N,N,N',N",N"-pentamethyldiethylenetriamine (PMDT);
N,N,N',N",N''',N'''-hexamethyltriethylenetetramine (HMTT);
tris-(β-dimethylaminoethyl)amine (iso-HMTT);
octamethylpentaethylenehexamine (OMPH);
heptamethyltetraethylenepentamine (HMTP);
N-(β-dimethylaminoethyl),N,N',N'-trimethyl-cyclohexane-1,2-diamine;
methyl di-(γ-dimethylaminopropyl)amine; and the like.

The catalyst complex may be readily prepared by mixing an organosodium whose parent hydrocarbon is the telogen with the desired chelating agent in the presence of the telogen as the solvent. An inert diluent may be used which has a pKa greater than that of the parent hydrocarbon of the organosodium compound. The pKa is defined by the MSAD acidity scale; see Donald J. Cram, Fundamentals of Carbanion Chemistry, Academic Press, N.Y., p. 19, hereby incorporated by reference. Alternatively, the catalyst complex may be prepared by mixing an organosodium whose parent hydrocarbon has a pKa greater than that of the telogen with the chelating agent of choice in the telogen as solvent. Transmetalation occurs to produce the desired complex. An inert diluent may also be used. Alternatively, a preformed complex may be used providing the organosodium is derived from a hydrocarbon having a pKa less than about 38. With more reactive organosodium compounds, such as alkylsodiums, preformed complexes may undergo rapid decomposition.

The complex may be readily prepared at temperatures from about −100° C. to about 150° C., preferably 0 to 100° C.; the latter temperature range is preferred because of convenience and also since higher temperatures favor dissociation of the less stable complexes or decomposition of the more reactvie organosodiums. Pressures may range from subatmospheric to 100 p.s.i.g. or more. For the sake of convenience, atmospheric pressure is preferred.

The catalyst of the invention varies in efficiency, i.e., grams of product produced per gram of catalyst, increasing mole ratio of chelating tertiary polyamine to organosodium. The mole ratio may vary from about 0.1 to 50, preferably 0.5 to 10. As described herein, the selectivity to low molecular weight telomer can sometimes be increased by increasing the ratio of chelating tertiary polyamine to organosodium.

The amount of organosodium catalyst component used in the reaction will vary according to the nature of the reactants and the conditions. In general, the catalyst concentration will vary between about 0.01 and 50 g./l., preferably 0.1–10 g./l. The catalyst of the instant invention has demonstrated great efficiency at moderate conditions of time, temperature and pressure. For example, efficiencies in excess of 500, under reaction conditions comprising a temperature of about 80° C., atmospheric pressure, and 5 hours contact time, have been obtained. The catalyst of the instant invention is preferably prepared in situ. The organosodium is preferably added to the solvent-reaction mixture under an inert atmosphere, followed by the slow addition of chelating tertiary polyamine while agitating.

The improved process of the instant invention comprises reacting a conjugated diolefin with a product selected from the group consisting of aromatic and olefinic hydrocarbons in the presence of a catalyst selected from the previously defined class to give a reaction mixture comprising a substantial amount, i.e., at least 5%, preferably over 40%, of low molecular weight telomers, i.e., mono- and di-adducts, especially mono-adducts.

The conjugated diolefin compounds within the scope of this invention are not restricted in size, but will normally contain from 4–20 carbons. The preferred diolefins include butadiene, isoprene, 2,3-dimethyl butadiene, piperylene, 1,3-hexadecadiene, etc. The substituents if any present in the diolefin molecule must not be capable of destroying the catalyst and may include 1 or 2 dialkylamino and trialkylsilyl groups. Substituents such as hydroxy, carbonyl, nitro, halide, alkoxy, and primary amines will not function within the scope of this invention since they act to destroy the catalyst.

The aromatic and olefinic hydrocarbons function within the scope of this invention as weak hydrocarbon acids. The aromatic compounds may include aromatic nitrogen heterocycles such as pyridine and its derivatives. The weak hydrocarbon acids useful in the process of this invention include benzene; methyl substituted benzenes; higher alkylbenzenes such as ethylbenzene, t-butylbenzene, eicosylbenzene and the like; di-n-propylbenzene; naphthalene, diphenylmethane; biphenyl; triphenylmethane; pyridine; 2,6-dimethylpyridine; quinoline; tetralin; phenylcyclohexane; octene-1 and its isomers; dimethylbutene; cyclohexene; cyclooctene; tetramethylethylene; isobutylene; propenylcyclohexane; propylene and the like. The substituents on the aromatic must include at least one unnindered hydrogen or methyl group and, on the olefins, at least one hydrocarbon group containing an allylic hydrogen.

The methyl substituted aromatics, especially toluene, are most preferred for making low molecular weight telomers. It should be noted that when aromatics are used the conjugated diolefin will usually react at a benzylic position. When benzylic hydrogens are absent, as for example in tertiary butyl benzene, the conjugated olefin will add directly to the ring.

The weak hydrocarbon acids function as chain transfer agents. Compounds containing benzylic hydrogen (toluene being especially effective) are most efficient and thus are preferred for making low molecular weight telomers. The critical limitation on the chain transfer agent is that the carbanion formed upon metalation must be capable of initiating diolefin polymerization. The weak hydrocarbon acids preferably have a pKa of from about 32 to 37.

The reactant aromatic or olefin can be used as the solvent for the reactants, or inert solvents may be added. The molecular weight of the reaction product will increase as the inert solvent concentration is increased; therefore preferably the aromatic or olefin comprises 50 to 100 wt. percent of the solvent, and most preferably 90 to 100 wt. percent. In general, the only requirements for the solvent are that it be capable of dissolving the catalyst (since a homogeneous system is preferred for low molecular weight products) and at least a small amount of the diolefin under the reaction conditions employed. The solvent, of course, should remain substantially in liquid phase under reaction conditions.

The telomerization process may be carried out at temperatures in the range of −50° to +150° C., preferably from 0° to 100° C. Pressures range from subatmospheric to 100 p.s.i.g. or more, preferably from 1 to 50 p.s.i.g., the lower pressure favoring formation of low molecular weight telomers. Atmospheric pressure is usually employed for convenience. When very low molecular weight products are desired, the diolefin may be introduced into the gas phase above the catalyst-reactant solution. The addition of diolefin may also be accomplished by bubbling it into the catalyst-reactant solution neat or diluted with an inert gas, such as methane or argon. Increased dilution favors the formation of low molecular weight products. Reaction times will normally be between 10 minutes and 10 hours, preferably 1–5 hours.

In the process of this invention, the diolefin is usually added to the aromatic or olefin so that the latter will be in excess during the course of the reaction. These conditions favor the formation of the desired low molecular weight telomers. As stated previously, a particularly effective method of keeping the molecular weight low comprises introducing the diolefin, as a gas, into the vapor phase above the reactant solutions. Over 60% conversion to the mono-adduct has been achieved by use of this invention. The rate of flow of diolefin into the reaction zone will also affect the selectivity to mono-adduct. Under similar conditions, decreasing the flow rate increases the selectivity, as does decreasing the diolefin pressure above the liquid phase. The optimum rate of flow and pressure will be determined by balancing the desired selectivity with the desired reaction rate.

The reaction products, obtainable from the process of this invention, are useful as intermediates for making plasticizers, surfactants, and flame retardants. For example, the tri-adducts of butadiene and toluene can be hydrogenated to remove the unsaturation and then sulfonated to produce an alkyl benzene sulfonate useful because of its biodegradable properties as a detergent. The mono- and di-adduct of butadiene and toluene could be converted to mono- and di-hydroxy alkylbenzene, for example in the hydroformylation reaction, which would be useful for making ester plasticizers for polymers, such as polyvinyl chloride or polyvinyl acetate, or could be further reacted with ethylene or propylene oxide to give novel surfactants.

In a preferred embodiment of the instant invention, toluene is reacted with butadiene in the presence of a small amount of benzylsodium chelated by heptamethyltetraethylenepentamine to yield 60% pentenyl benzene. The pentenyl benzene is hydroformylated to produce particularly attractive plasticizer alcohols. Higher adducts are reacted with bromine to give the brominated derivatives which are useful as flame retardants.

The following are specific embodiments of the instant invention:

EXAMPLE 1

To a four-neck flask, oven dried, fitted with a magnetic stirrer, condenser, thermometer septum cap, gas inlet tube (above the liquid level) and addition funnel, in a nitrogen atmosphere, the following were added: 500 ml. toluene (dried over $CaH_2$), 5 mmoles of benzylsodium and 5 ml. of 1 M pentamethyldiethylenetriamine (PMDT). The reaction mixture was heated to 50° C. and butadiene gas was introduced through the glass inlet tube at rates varying between 50 cc./min. and 700 cc./min. for two hours. At the end of this time the reaction was quenched with 5 ml. water and dried with $K_2CO_3$. The reaction product was distilled, leaving 30% bottoms, and the distillate was analyzed by gas chromatographic analysis (GC). Product selectivities were found to be mono-adducts 20%, di-adducts slightly less than 20%, higher distillable adducts 30%, and bottoms 30%. The structures of the mono-adducts were determined by GC, GC-mass spectra, and infrared analysis to be the compounds illustrated by I and II.

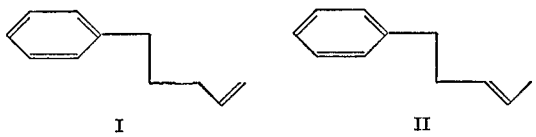

I   II

EXAMPLE 2

To 0.5 g. of benzylsodium and 600 ml. of toluene was added 0.7 ml. of tris-($\beta$-dimethylaminoethyl) amine [iso-HMTT]. The reaction was heated to 80° C. Butadiene was then introduced into the atmosphere above the reaction at a rate of 250 cc. gas/min. for 5 hours. At the end of this time, 10 ml. of water was added and the organic layer separated and dried with $K_2CO_3$. The toluene was removed under vacuum and the residue fractionally distilled at water aspirator pressure to give 75 g. of mono-adduct. The ratio of alpha to internal unsaturation was 1.25. The total reaction product after the remaining toluene was distilled off weighed 281 g. This example demonstrates that iso-HMTT can be used as a chelating tertiary polyamine within the scope of the instant invention. Further, this example shows that less than stoichiometric amounts of chelating agent can be used. The ratio of chelating agent to organosodium was approximately 0.5:1.

EXAMPLE 3

The effect of varying the chelating agent was ascertained as follows: to 2.63 mmoles benzylsodium were added either no chelating agent or 2.63 mmoles and 50 ml. toluene. The reaction was heated to 40° C. and maintained at 40° C. while gaseous butadiene was introduced into the atmosphere above the reaction at the rate of 22 cc./min. for two hours. At the end of this time, 5 ml. of water was added and the organic layer separated and dried with $K_2CO_3$. The toluene was removed at water aspirator pressure and the residue distilled at 140° C./0.05 mm. The distillate was analyzed by gas chromatography.

TABLE I

| Chelating agent | Total product, g. | Selectivity to mono-adduct, percent | Alpha/internal unsaturation |
|---|---|---|---|
| None | 6.0 | 34 | 0.5 |
| TMED | 15.8 | 32 | 0.5 |
| PMDT | 11.5 | 26 | 1.2 |
| iso-HMTT | 13.3 | 45 | 1.6 |
| HMTP | 17.5 | 60 | 1.4 |
| OMPH | 15.8 | 59 | 1.5 |
| Triglyme | (¹) | | |

¹ No reaction.

The use of triglyme (triethyleneglycol dimethyl ether) as a chelating agent gave an inactive catalyst. Presumably, the catalyst decomposed via metalation of the chelating agent. In terms of selectivity to mono-adduct and alpha-internal unsaturation, the TMED·BzNa gives results similar to benzylsodium alone whereas complexes containing the higher chelating agents differ markedly from benzylsodium alone. This is a reflection of the relative stability of the complexes. At 40° C., TMED·BzNa is a relatively weak complex, while PMDT·BzNa and the complexes with higher chelating agents are relatively strong complexes. The experiments in Table II were run under similar conditions, except the reaction temperature was 55° C.

TABLE II

| Chelating agent | Total product, g. | Selectivity to mono-adduct, percent | Alpha/internal unsaturation |
|---|---|---|---|
| None | ¹ 0.050 | ~0 | |
| TMED | 11.8 | 41.5 | 0.21 |
| PMDT | 9.5 | 18 | 0.85 |
| iso-HMTT | 8.6 | 6.2 | 1.72 |
| HMTP | 11.2 | 22.5 | 1.5 |

¹ Waxy solid.

Table II shows that at 5° C. TMED·BzNa is a relatively strong complex since the results differ from the results obtained with benzylsodium alone at this temperature. In general, the polyamine organosodium complexes are stronger at lower temperatures.

EXAMPLE 4

These reactions were run under the same conditions as in Example 3, Table I, except 13.15 mmoles of chelating agent were used instead of 2.63 mmoles. Hence, the ratio of chelating agent to benzylsodium was 5:1.

TABLE III

| Chelating agent | Total product, g. | Selectivity to mono-adduct, percent | Alpha/internal unsaturation |
|---|---|---|---|
| TMED | 14.7 | 51 | 0.74 |
| PMDT | 14 | 39 | 1.03 |

This example shows that beneficial results may sometimes be obtained by the use of greater than stoichiometric amounts of chelating agent.

EXAMPLE 5

To 1.6 ml. of 1.6 N n-butyllithium in hexane were added 50 ml. toluene and 0.6 ml. PMDT, generating PMDT·BzLi in situ. The reaction was maintained at 40° C. while butadiene was introduced into the atmosphere above the reaction at a rate of 22 cc./min. for 2 hours. At the end of this time, the reaction was quenched with 5 ml. of water. The organic layer was separated, dried ($K_2CO_3$), and the solvent removed under vacuum to give 5 g. of a product having $M_n=2549$ as determined by vapor phase osmometry. This example shows that organolithium·amine complexes are significantly less reactive in the chain transfer step of telomerizations than the analogous organosodium complexes.

EXAMPLE 6

To 0.95 ml. of 1.6 N n-butyllithium (1.5 mmoles) were added 50 ml. toluene, 0.17 g. (1.5 mmoles) benzylsodium and 0.45 ml. (~3 mmoles) TMED. The reaction was heated to 40° C. and maintained at that temperature while gaseous butadiene was introduced into the atmosphere above the reaction at the rate of 22 cc./min. for 2 hours. At the end of this time, the reaction was quenched with 5 ml. of water and the organic layer separated and dried with $K_2CO_3$. The toluene was removed at water aspirator pressure and the residue distilled (140°/0.05 mm.). The distillate was analyzed by gas chromatography. Total product weight was 6.1 g. Selectivity to mono-adduct was 8.6%. The ratio of alpha to internal unsaturation was 1.25. This example shows that the use of an amine·organolithium·organosodium catalyst changes the nature of the reaction. The effect of the organolithium is to change the catalyst to one favoring formation of higher molecular weight telomers with a corresponding decrease in the yield of mono-adduct.

EXAMPLE 7

To determine the effect of temperature on the reaction, the following experiments were run: to 2.63 mmoles (iso-HMTT·BzNa was added 50 ml. of toluene. Butadiene was then introduced into the reaction atmosphere at 22 cc./min. for two hours at 5°, 40° and 70° C.

| | Telomer yield, g. | Selectivity to mono-adduct, percent | Alpha/internal unsaturation |
|---|---|---|---|
| Temperature, ° C.: | | | |
| 5 | 8.6 | 6.2 | 1.7 |
| 40 | 13.3 | 45 | 1.6 |
| 70 | 15.0 | 67 | 0.9 |

This example shows that as the reaction temperature is increased, the rate of chain transfer increases faster than the rate of polymerization. Consequently, activation energy for chain transfer is higher than activation energy for polymerization. The ratio of alpha/internal unsaturation shows that the rate of product isomerization also increases with higher temperature.

EXAMPLE 8

To 2.63 mmoles of iso-HMTT·BzNa was added 50 ml. of toluene. The reaction was heated to 70° C. and maintained at that temperature while butadiene was introduced at various rates and for various periods of time.

| | Time (min.) | Selectivity of mono-adduct, percent | Alpha/internal unsaturation |
|---|---|---|---|
| $C_4H_6$ rate (cc./min.): | | | |
| 22 | 120 | 67 | 0.88 |
| 44 | 60 | 63 | 0.91 |
| 66 | 40 | 59 | 1.03 |
| 110 | 24 | 57 | 1.35 |

This example shows that product isomerization increases with reaction time. Further, more rapid addition of butadiene decreases selectivity to mono-adduct.

EXAMPLE 9

To 0.3 g. benzylsodium were added 50 ml. of toluene and 0.7 ml. of iso-HMTT. To this reaction mixture at 70° C. was added dropwise a solution of 20 ml. isoprene in 25 ml. toluene over a period of 80 min. A work-up similar to that used in Example 3 was used. The toluene-isoprene telomer product weighed 23.8 g. Selectivity to mono-adduct was 64% based on GC analysis. This example shows that isoprene is a suitable conjugated diolefin in the telomerization reaction.

EXAMPLE 10

To 0.26 g. (2.63 mmoles) of phenylsodium were added 50 ml. of benzene and 0.7 ml. of iso-HMTT. The reaction was maintained at 70° C. while butadiene was introduced into the atmosphere above the reaction at a rate of 22 cc./min. for 2 hours. A work-up similar to Example 6 gave 7 g. of benzene-butadiene telomer product with $M_n=998$. This example shows that benzene is a suitable hydrocarbon acid in the telomerization reaction.

EXAMPLE 11

To 0.3 g. of n-amylsodium were added 50 ml. of 1-octene and 0.7 of iso-HMTT. To this reaction mixture at 40° C. was added butadiene gas at the rate of 22 cc./min. for 2 hours. A work-up similar to Example 5 gave 4.6 g. of octene-butadiene telomer product with $M_n=2422$. This example shows that 1-octene is a suitable hydrocarbon acid in the telomerization reaction.

EXAMPLE 12

The active benzylsodium catalyst in toluene-butadiene telomerization can be generated by reacting an organosodium compound more basic than benzylsodium with toluene. The MSAD acidity scale may be used as a guide to which oragnosodium compounds are more basic than benzylsodium. Phenylsodium, allylsodium, and amylsodium are suitable examples. Hence, to 0.26 g. (2.63 mmoles) phenylsodium were added 50 ml. of toluene and 0.7 ml. (ca. 2.63 mmoles) iso-HMTT. To this reaction mixture at 70° C. was added butadiene by introducing it into the atmosphere above the reaction at the rate of 66 cc./min. for 40 min. A work-up similar to that in Example 3 was used. Total toluene-butadiene telomer weighed 13.1 g. GC analysis showed selectivity to mono-adduct to be 62%. The ratio of alpha-internal unsaturation was 1.1. The mono-adducts were determined to be pentenylbenzenes rather than butenylbenzenes on the basis of GC analysis and amount formed (53 mmoles pentenylbenzenes versus 2.63 mmoles of catalyst). Comparison of the above results with the results for iso-HMTT°BzNa under identical reaction conditions (Example 8) shows that iso-HMTT·BzNa was the active catalyst in this example.

What we claim is:

1. In a process for telomerizing conjugated diolefins with aromatics and olefins by contacting the diolefin and a compound selected from the group consisting of aromatics and olefins at a temperature of from about —50° to 150° C. in the presence of a catalyst, the improvement which comprises utilizing a catalyst comprising an organosodium compound selected from the group consisting of compounds having a general formula RNa wherein R is $C_1$ to $C_{20}$ hydrocarbon radical selected from the group consisting of alkyl, cycloalkyl, aryl, aralkyl, alkaryl, alkenyl and cycloalkenyl radicals, and a chelating tertiary polyamine, selected from the group consisting of tertiary polyamines having the general formula

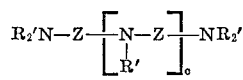

wherein R' can be the same or different alkyl or cycloalkyl group having from 1 to 10 carbon atoms; Z is selected from the group consisting of (1) a $C_4$–$C_{10}$ cycloaliphatic radical attached to N at the 1,2- or 1,3-positions, and (2) 2 or 3 methylenic radicals wherein each contains 0 to 2 monovalent aliphatic hydrocarbon radicals of 1 to 6 carbon atoms; and c is an integer of from 0 to 10,000.

2. The process of claim 1 wherein the pressure range is from subatmospheric to about 100 p.s.i.g.

3. The process of claim 2 wherein the aromatic and olefinic component is selected from the groups consisting of hydrocarbons having a pKa of from about 32 to 37.

4. The process of claim 3 wherein the diolefin contains from 4 to about 20 carbon atoms.

5. The process of claim 3 wherein R is a hydrocarbon radical selected from the group consisting of phenyl, benzyl, and allyl.

6. The process of claim 4 wherein the temperature of reaction is from 0° to 100° C. and the pressure ranges from 1 to 50 p.s.i.g.

7. The process of claim 4 further limited by the requirement that the reactants from the telomerization reaction comprise a substantial amount of low molecular weight products.

8. The process of claim 4 wherein the aromatic or olefin component is kept in excess as compared to the diolefin.

9. The process of claim 4 wherein the diolefin is contacted with the aromatic or olefin by introducing the diolefin into the vapor phase above the solvent-catalyst mixture.

10. The process of claim 4 wherein the molar ratio of organosodium to chelating tertiary polyamine is from 0.1 to 50.

11. The process of claim 4 wherein the molar ratio of organosodium to chelating tertiary polyamine is from 0.5 to 10.

12. In an improved process for telomerizing conjugated diolefins with aromatics by contacting the diolefin and the aromatic at reaction conditions in the presence of a catalyst and recovering predominantly mono- and diadducts, the improvement which comprises use of a catalyst comprising an organosodium compound, selected from the group consisting of compounds represented by the general formula R—Na wherein R is a hydrocarbon radical containing from 1 to 20 carbon atoms and selected from the group consisting of alkyl, cycloalkyl, aryl, aralkyl, alkaryl, alkenyl and cycloalkenyl, chelated by an alkyl or cycloalkyl tertiary polyamine selected from the group consisting of compounds represented by the general formula:

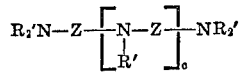

wherein R' can be the same or different alkyl or cycloalkyl group having from 1 to 10 carbon atoms; Z is selected from the group consisting of (1) a $C_4$-$C_{10}$ cycloaliphatic radical attached to N at the 1,2- or 1,3-positions, and (2) 2 or 3 methylenic radicals wherein each contains 0 to 2 monovalent aliphatic hydrocarbon radicals of 1 to 6 carbon atoms; and $c$ is an integer of 0 to 10,000.

13. The process of claim 12 wherein the molar ratio of organosodium to chelating tertiary polyamine is from 0.1 to 50.

14. The process of claim 13 wherein the temperature of reaction is from —50° C. to +150° C.

15. The process of claim 14 wherein the pressure range is from 1 to 50 p.s.i.g.

16. The process of claim 15 wherein the R in R—Na is a hydrocarbon radical selected from the group consisting of aryl, aralkyl, alkaryl, and unsaturated hydrocarbons having at least one allylic hydrogen.

17. The process of claim 16 wherein the $c$ in the general formula

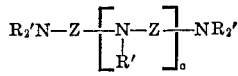

is an integer from 1 to 4.

18. The process in claim 17 wherein the R in R—Na is a hydrocarbon radical selected from the group consisting of phenyl, benzyl and allyl.

19. The process in claim 18 wherein the diolefin is butadiene.

20. The process in claim 19 wherein the aromatic is toluene.

21. The process in claim 20 wherein $c$ is an integer from 0 to 4, R' is methyl and Z is ethylene.

22. In a process for telomerizing conjugated diolefins with aromatics and olefins by contacting the diolefin and a compound selected from the group consisting of aromatics and olefins at a temperature of from about —50° to 150° C. in the presence of a catalyst, the improvement which comprises utilizing a catalyst comprising an organosodium compound selected from the group consisting of compounds having a general formula RNa wherein R is a $C_1$ to $C_{20}$ hydrocarbon radical selected from the group consisting of alkyl, cycloalkyl, aryl, aralkyl, alkaryl, alkenyl and cycloalkeny radicals, and tris-($\beta$-dimethylaminoethyl) amine.

References Cited
UNITED STATES PATENTS

| | | | |
|---|---|---|---|
| 3,244,758 | 4/1966 | Eberhardt | 260—671 A |
| 3,451,988 | 6/1969 | Langer, Jr. | 260—680 B X |
| 3,458,586 | 7/1969 | Langer, Jr. | 260—668 B |
| 3,450,795 | 6/1969 | Langer, Jr. | 252—431 N X |
| 3,206,519 | 9/1965 | Eberhardt | 260—671 B |
| 3,189,660 | 6/1965 | Pappas et al. | 260—671 G |
| 2,728,802 | 12/1955 | Clossom et al. | 260—668 B |
| 2,984,691 | 5/1961 | Fotis, Jr. | 260—668 B |

JAMES E. POER, Primary Examiner

H. M. S. SNEED, Assistant Examiner

U.S. Cl. X.R.

260—671 A, 680 B